(12) United States Patent
Schröter et al.

(10) Patent No.: US 12,078,274 B2
(45) Date of Patent: Sep. 3, 2024

(54) CONNECTION UNIT FOR CONNECTING FLUID LINES

(71) Applicant: Fränkische Industrial Pipes GMBH & CO. KG, Königsberg (DE)

(72) Inventors: Sören Schröter, Königsberg (DE); Johannes Barfuss, Königsberg (DE)

(73) Assignee: Fränkische Industrial Pipes GMBH & CO. KG, Königsberg (DE)

( * ) Notice: Subject to any disclaimer, the term of this patent is extended or adjusted under 35 U.S.C. 154(b) by 145 days.

(21) Appl. No.: 17/919,366

(22) PCT Filed: Mar. 16, 2021

(86) PCT No.: PCT/EP2021/056670
§ 371 (c)(1),
(2) Date: Oct. 17, 2022

(87) PCT Pub. No.: WO2021/209212
PCT Pub. Date: Oct. 21, 2021

(65) Prior Publication Data
US 2023/0184361 A1 Jun. 15, 2023

(30) Foreign Application Priority Data
Apr. 16, 2020 (DE) ...................... 10 2020 204 825.8

(51) Int. Cl.
*F16L 37/14* (2006.01)
*F16L 37/098* (2006.01)

(52) U.S. Cl.
CPC ......... *F16L 37/144* (2013.01); *F16L 37/0982* (2013.01); *F16L 37/0985* (2013.01); *F16L 2201/10* (2013.01)

(58) Field of Classification Search
CPC . F16L 37/144; F16L 37/0841; F16L 37/0844; F16L 37/0847; F16L 37/0885;
(Continued)

(56) References Cited

U.S. PATENT DOCUMENTS

2006/0285917 A1  12/2006  Pepe
2010/0032937 A1  2/2010  Kerin et al.
(Continued)

FOREIGN PATENT DOCUMENTS

DE  102009036526 A1  2/2010
EP  1734299 A2  12/2006
(Continued)

OTHER PUBLICATIONS

German Application No. DE102020204825.8, Search Report mailed Dec. 18, 2020, 5 pages.
(Continued)

*Primary Examiner* — Aaron M Dunwoody
(74) *Attorney, Agent, or Firm* — Kilpatrick Townsend & Stockton LLP (57) ABSTRACT

A connection unit for connecting fluid lines, including a plug-in unit connectable to a first fluid line not belonging to the connection unit, defining a first fluid flow channel in its interior, and a receiving unit connectable to a second fluid line not belonging to the connection unit, defining a second fluid flow channel in its interior. The plug-in unit and the receiving unit are connectable to establish a fluid connection between the first and second fluid flow channels. The connection unit also includes a release element transferrable from a holding state to a release state upon insertion of the plug-in unit into the receiving unit up to a predetermined depth, and an indicator element formed separately from the release element and locked by the release element in the holding state. The indicator element is detachable from the connection unit when the release element is in the release state.

21 Claims, 10 Drawing Sheets (58) Field of Classification Search
CPC ....... F16L 37/096; F16L 37/098; F16L 37/12; F16L 37/1225; F16L 37/133; F16L 37/142; F16L 2201/10
See application file for complete search history.

(56) References Cited

U.S. PATENT DOCUMENTS

| | | | |
|---|---|---|---|
| 2010/0148491 A1* | 6/2010 | Takenaka | F16L 37/0985 285/24 |
| 2012/0104746 A1* | 5/2012 | Fansler | F16L 37/0885 285/239 |
| 2014/0197629 A1* | 7/2014 | Barthel | F16L 37/0985 285/93 |
| 2020/0191310 A1* | 6/2020 | Kim | F16L 37/12 |
| 2020/0292116 A1 | 9/2020 | Nagaya et al. | |

FOREIGN PATENT DOCUMENTS

| | | |
|---|---|---|
| EP | 3686470 A1 | 7/2020 |
| WO | 2019059013 A1 | 3/2019 |

OTHER PUBLICATIONS

International Application No. PCT/EP2021/056670, International Search Report and Written Opinion mailed Jun. 9, 2021, 18 pages.

* cited by examiner

CONNECTION UNIT FOR CONNECTING FLUID LINES

CROSS REFERENCE TO RELATED APPLICATION

This application is a U.S. national phase of International Patent Application No. PCT/EP2021/056670 filed on Mar. 16, 2021, which claims priority to German Patent Application No. 10 2020 204 825.8, filed in Germany on Apr. 16, 2020. The entire contents of both applications are hereby incorporated herein by reference.

The present invention relates to a connection unit for connecting fluid lines, comprising a plug-in unit which is designed to be connected to a first fluid line which does not belong to the connection unit and which defines a fluid flow channel in its interior, and a receiving unit which is designed to be connected to a second fluid line which does not belong to the connection unit and which defines a fluid flow channel in its interior, the plug-in unit and the receiving unit being designed to be connectable to one another in such a way that a fluid connection is established between the two fluid flow channels.

There are different types of so-called "quick connectors" on the market, which are mainly used for fluid connections in the automotive sector. A quick connector comprises a plug-in unit (plug) and a receiving unit (socket). When the plug-in unit and the receiving unit are brought together, the two parts lock onto one another so that they are secured in the axial direction.

Quick connectors have the advantage that no additional step of pressing in or moving a locking element is necessary to establish a secure connection. Rather, the locking connection takes place with a "click" as soon as it is pushed in.

Since a firm connection can be made very easily with the help of quick connectors by pushing the plug into the socket, they are preferably used in cramped conditions, such as in the engine compartment.

However, quick connectors have the disadvantage that, especially in the aforementioned case of a cramped installation space without a direct line of sight, the locking cannot be verified. It can therefore happen that a secure connection seems to have been established for the user when the plug-in unit has been pushed into the receiving unit, although no actual locking has taken place, such that the connection could become detached. Since, for a fluid-tight connection of the plug-in unit and the receiving unit, a sealing element is usually also arranged between the plug-in unit and the receiving unit, and this can result in increased pull-out resistance in the axial direction, even without locking, it can even happen that a connection is initially tight, but then loosens or leaks when axial tensile forces or vibrations occur.

It is therefore the object of the present invention to provide a plug-in connection in which the correct locking of the plug-in unit and the receiving unit can be verified, and in particular documented.

This object is achieved according to the present invention by a connection unit for connecting fluid lines, comprising a plug-in unit which is designed to be connected to a first fluid line which does not belong to the connection unit and which defines a fluid flow channel in its interior, and a receiving unit which is designed to be connected to a second fluid line which does not belong to the connection unit and which defines a fluid flow channel in its interior, the plug-in unit and the receiving unit being designed to be connectable to one another in such a way that a fluid connection is established between the two fluid flow channels, and the connection unit further comprising a release element which is designed to be transferred from a holding state to a release state upon insertion of the plug-in unit into the receiving unit up to a predetermined depth, the connection unit further comprising an indicator element which is formed separately from the release element and which is locked by the release element when the same is in the holding state, and can be detached from the rest of the connection unit, in particular non-destructively, when the release element is in the release state.

By correctly bringing the plug-in unit and the receiving unit together, the indicator element is released—and as a result, it can be removed and used for documentation, for example. The fact that the indicator element can be removed from the rest of the connection unit shows the user of the connection unit according to the invention that a connection between the plug-in unit and the receiving unit has been correctly carried out, without the need to carry out a visual inspection of the connection.

It can therefore be particularly advantageous if the holding state of the release element or a displacement of the release element relative to the connection unit, for example the receiving unit, according to which the indicator element can be detached from the rest of the connection unit, is only achieved after a secure connection between the plug-in unit and the receiving unit has taken place. Particularly preferably, the predetermined depth of the plug-in unit inserted into the receiving unit at which the release element is displaced far enough out of the holding state that the indicator element can be removed is equal to a predetermined depth at which the correct connection (locking) between the plug-in unit and the receiving unit occurs.

Especially from a manufacturing point of view and with regard to the tolerances required for this, it can also be conceivable to deliberately arrange the insertion depth of the plug-in unit into the receiving unit at which the indicator element is released, viewed in the direction of insertion of the plug-in unit into the receiving unit, to a later point, i.e., further to the rear, (for example, in the range of 0.1 mm to 3 mm, in particular around 1 mm) so as to ensure that the mutual securing of the plug-in unit and the receiving unit occurs before the indicator element is released, even in the most unfavourable production case.

It should be mentioned in this case that the plug-in unit can, however, come into contact with the release element before the plug-in unit and the receiving unit are connected, in order, for example, to build up a force for displacing the release element from its holding state. It should also be mentioned that when designing the insertion depth of the plug-in unit into the receiving unit at which the indicator element can be removed, it should also be taken into account that the release element, after leaving the holding state of the release element, and possibly also by a movement of the indicator element, can be further displaced in the direction of the release state without requiring further insertion of the plug-in unit.

In order to be able to clearly distinguish the indicator element from the rest of the connection unit, it can be advantageous for the indicator element to have a different color from the rest of the connection unit, in particular from the plug-in unit and/or the receiving unit. In particular, the indicator element can have a signal color, for example red.

The release element can be designed as a part which is separate from the receiving unit, and which is connected to the receiving unit after each manufacture; or the release element can be designed as a single piece together with the receiving unit, in which case the release element can be displaceably, in particular resiliently, mounted on the receiving unit, for example.

An established fluid connection within the meaning of the aforementioned feature of the connection of the two fluid flow channels is to be achieved in this case in particular by a fluid connection that is sealed towards an outside of the connection unit. It should also be added that the fluid lines to be connected can comprise both smooth pipes and corrugated pipes, which can be connected, for example, to the connection unit via a sawtooth profile or fir tree profile formed on the plug-in unit or on the receiving unit.

Advantageously, the indicator element can be designed as an elongate rod element which on its one end is provided with an engagement structure matching a counter-shaped engagement structure of the release element, and on its other end is provided with a grip element. Providing a grip element allows the indicator element to be separated from the connection unit in an improved manner. The design of the indicator element as an elongate rod element does not necessarily have to be straight, but can also be curved, for example C-shaped or S-shaped, such that the indicator element can be designed according to an intended installation situation, so as to reach a position, for example in the engine compartment described above, at which the grip element can be easily gripped by a user.

For this purpose, the grip element can be designed as a tab or as a ring, in particular as a single piece together with the rod element. For example, the ring can be designed in such a way that a user can insert at least one finger into the ring, even if the user should be wearing gloves.

In a development of the present invention, the indicator element can have a length which corresponds at least to the length of the fluid flow channel of the receiving unit, in particular to at least three times that length. The length of the indicator element can be measured as a direct connection between the two longitudinal ends of the indicator element, i.e., from the engagement structure to the grip element of the indicator element. The length of the fluid flow channel can be measured, for example, along a main flow direction of fluid through the fluid flow channel.

Furthermore, the indicator element can comprise a machine-readable marking, which in particular has a DMC code. The indicator element can be scanned via the machine-readable marking, in particular after it has been pulled off the connection unit, such that the correct connection of the connection unit can be documented by machine. Of course, it is also conceivable that the connection unit is also scanned before it is installed in order to generally document its use.

The indicator element can advantageously be removable from the rest of the connection unit along a direction which is substantially parallel to a central axis of the fluid flow channel of the receiving unit or the plug-in unit and/or to a plug-in direction of the plug-in unit into the receiving unit. This means that the direction in which the two mutually opposite engagement structures of the release element and indicator element move away from one another when detached can be oriented parallel to a direction in which the plug-in unit is inserted into the receiving unit. Again with regard to an installation situation with severely restricted freedom of movement, it can thus be made possible that the connection of the plug-in unit and the receiving unit and the removal of the indicator element can be carried out in the same working space. For example, the direction in which the indicator element is pulled off can be opposite to or in the same direction as the plug-in direction of the plug-in unit into the receiving unit.

In this context, it should be added that the fluid flow channels of the plug-in unit or of the receiving unit can also be curved, in particular angled. In this case, the parallel extension of the removal direction of the indicator element can relate to a portion of the fluid flow channel and/or its centre line of the plug-in unit or of the receiving unit.

In order to be able to detach the indicator element or the engagement structure of the indicator element from the rest of the connection unit in a repeatable manner, the release element can be attached to the receiving unit so that it can pivot relative thereto. In this case, in particular, the entire release element can be pivoted in the same way, i.e., as an inherently rigid element, relative to the receiving unit. The release element therefore remains on the receiving unit after the indicator element has been removed.

The release element can have a projection which, when the release element is in the holding state, protrudes into a receiving space of the receiving unit designed to receive the plug-in unit in such a way that when the plug-in unit is inserted into the receiving unit, a portion, in particular an annular collar, of the plug-in unit comes into contact with the projection of the release element, such that a further insertion of the plug-in unit into the receiving unit displaces the release element in the direction of the release state. This can allow the indicator element to be released automatically. In other words, no additional action needs to be taken in order to be able to detach the indicator element from the rest of the connection unit when the plug-in unit is correctly connected to the receiving unit. Provision can also be made for the displacement of the release element relative to the receiving unit to merely release the indicator element, but not to exert any force causing a displacement of the indicator element relative to the rest of the connection unit, for example the receiving unit. Therefore, the indicator element can be prevented from moving in an unintended manner.

The projection of the release element can also have a defined stop, for example a lug, which comes into contact with a counter-stop on the receiving unit when the release element is in the release state.

In order to be able to prevent an unintentional release of the indicator element from occurring, the release element in its holding state can be locked to the receiving unit. In particular, a force which is applied by the locking of the release element in its holding state in order to hold the release element in its holding state should at least correspond to the force of gravity and/or normal loading forces during assembly of the connection unit which act on the release element in such a way that they cause a displacement of the release element from the holding state to the release state. Advantageously, the holding state of the release element can only be left after, in particular at the same time as, a correct connection of the plug-in unit and the receiving unit.

In particular, the release element can have a cylindrical portion, the centre line of which, when the release element is arranged on the receiving unit, defines the pivot axis of the release element relative to the receiving unit. A relative movement of the release element relative to the receiving unit can thus be generated in a predetermined manner.

In this case, the cylindrical portion of the release element can be connected to the receiving unit via a snap connection. A snap connection represents a particularly simple configuration in this case for arranging the release element on the receiving unit.

Furthermore, the receiving unit can comprise a locking device which is designed to interact with a corresponding locking device, in particular a projection and/or a recess, of the plug-in unit in such a way that the plug-in unit, upon insertion of the plug-in unit into the receiving unit up to the predetermined depth, automatically snaps into place with the receiving unit. "Automatic locking" is intended to mean in particular that the plug-in unit and the receiving unit can be secured to one another without any additional manual action, such as pressing in a locking part or the like. This securing can ensure that the plug-in unit cannot be detached from the receiving unit by mere axial force without being destroyed. The annular collar can, for example, have a circumferential chamfer or rounding on at least one side in order to be able to displace the locking device of the receiving unit, for example to push it radially outwards, when the plug-in unit is pushed into or pulled out of the receiving unit (see below). Alternatively or additionally, the locking device of the receiving unit, in particular a locking body connected thereto, can comprise a chamfer or a stop surface which, for example, extends so as to be inclined relative to the direction of insertion of the plug-in unit into the receiving unit, and which is designed to displace the locking device of the receiving unit and/or the locking body upon insertion of the plug-in unit into the receiving unit.

In particular, the projection may be the annular collar—advantageously, a surface opposite the portion of the annular collar with which the projection of the release element comes into contact. In this way, the annular collar of the plug-in unit can simultaneously fulfil the function of displacing the release element and the function of the locking device of the plug-in unit, which interacts with the locking device of the receiving unit.

In a development of the present invention, the receiving unit can comprise a main body and a locking body, the main body having the portion for connection to the second fluid line, and the locking body having the portion for connection to the plug-in unit. In this way, production, for example using an injection moulding process, can be simplified in particular. Furthermore, in the assembly of the main body and the locking body, a sealing unit, which consists, for example, of at least one O-ring, can be arranged between the locking body and the main body in such a way that the locking body of the main body holds the sealing unit in place when assembled.

In this case, the locking body can be inserted at least partially into the main body and, in the inserted state, can be secured against rotation on the main body.

As already mentioned, it can be advantageous if the connection unit is designed so that the indicator element is released by the release element only after or at the same time as a predetermined connection state of the plug-in unit with the receiving unit. In this way, the situation in which the indicator element can be removed, and a correct locking between the plug-in unit and the receiving unit is incorrectly indicated to a user as a result, even though this has not yet taken place, can be prevented.

Of course, it is also conceivable that the connection unit according to the invention is designed with additional functions and features, such as a locking element which can be displaced between a securing position and a detaching position, the locking element being able to detach the locking devices of the receiving unit and plug-in unit from one another in the detaching position in such a way that, for example, by lifting the locking element from the securing position into the detaching position, which is arranged radially further outwards relative to the fluid flow channel of the receiving unit, resilient locking hooks of the locking device of the receiving unit which interact with the annular collar of the plug-in unit are displaced radially outwards, such that the plug-in unit can be pulled out of the receiving unit without being destroyed. It is also conceivable that the locking element itself forms a locking mechanism with the plug-in unit, which locking mechanism is disengaged in the detaching position.

It may be the case that the locking element can be locked in the detaching position. This can be achieved, for example, by resilient arms which protrude from the main body of the receiving unit and which engage in corresponding recesses on the locking element in the detaching position and/or the securing position.

Hereinafter, the present invention will be described in greater detail using an embodiment with reference to the accompanying drawings, in which.

Figure 1:
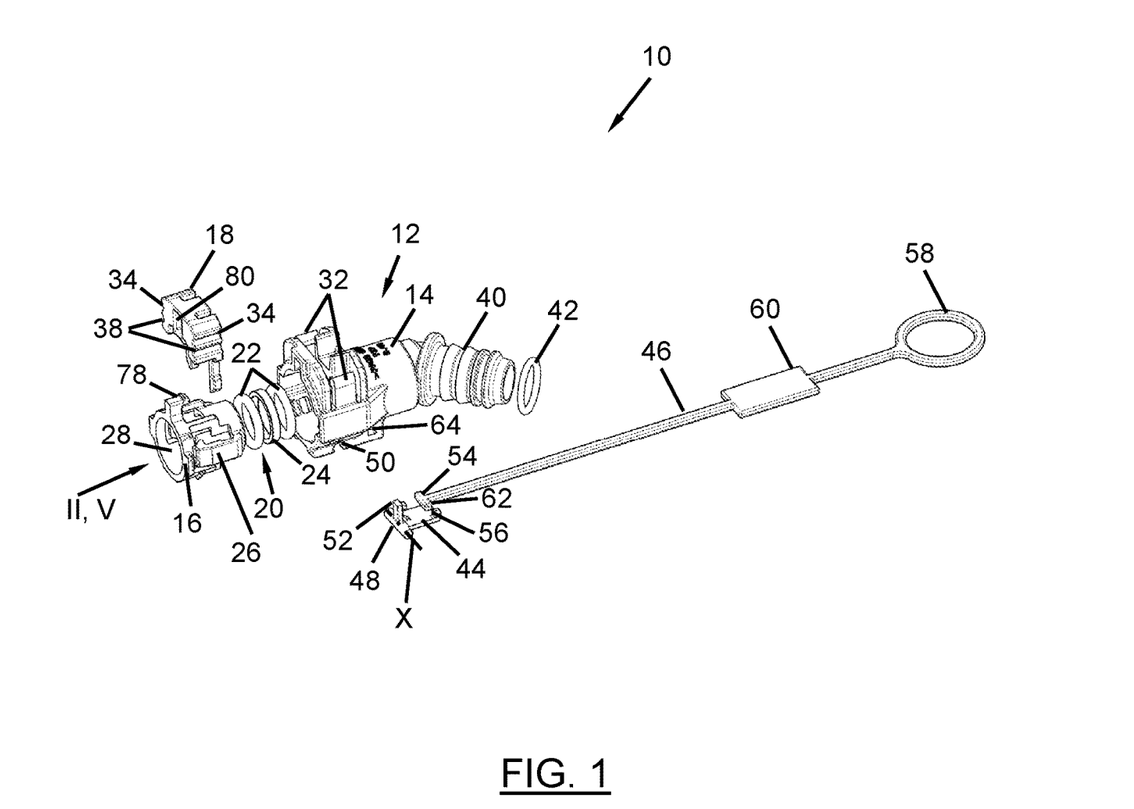
FIG. 1 is an exploded perspective view of a connection unit according to the invention.

In FIG. 1, a connection unit according to the invention is generally denoted with reference sign 10. The connection unit in this case comprises a receiving unit 12 which in turn comprises a main body 14 and a locking body 16, and also a locking element 18. The locking body 16 is inserted into the main body 14 from the left side shown in FIG. 1. Here, the locking body 16 is connected to the main body 14 in a non-destructive, non-detachable manner, for example by a locking connection. In the embodiment shown here, a sealing element 20 is arranged between the locking body 16 and the main body 14, which sealing element comprises two O-rings 22 and a spacer 24.

A locking device 26 is formed on the locking body 16, and is formed in this case from two diametrically opposite locking hooks 26. The locking hooks 26 protrude into a receiving space 28 of the locking body 16, i.e. the receiving unit 12, in such a way that they can come into contact with a plug-in unit 30 (see, for example, FIG. 3), which also forms part of the connection unit 10 according to the invention. In this embodiment, the locking hooks 26 are connected to the locking body 16 in such a way that their respective free ends are arranged closer to the start of the receiving space 28, at which the plug-in unit 30 is first inserted, than a connection between the locking hooks 26 and the locking body 16. The locking hooks 26 can be formed in particular in that they are surrounded by a recess that passes through a wall of the locking body 16. The locking body 16 has a fundamentally cylindrical shape, the length of which corresponds approximately to the diameter.

The locking element 18 is inserted into the main body 14 in a radial direction until resilient hooks 32 of the main body engage with corresponding recesses 34 of the locking element 18. For this purpose, the locking body 16 is first inserted a first distance into the main body 14, then the locking element 18 is inserted into the main body 14, the locking element 18 also partially passing through the locking body 16 (at the locking hooks 26). Subsequently, the locking body 16 is fully inserted into the main body 14. A receptacle for receiving the locking element 18 on the main body 14 is designed as a narrow rectangle, with the narrow sides of the rectangle extending parallel to the axial extension of the main body 14. The recesses 34 of the locking element 18 define a securing position of the locking element 18 relative to the main body 14 in which the locking element 18 does not prevent the interaction of the receiving unit 12 with the plug-in unit 30 and/or the interaction of the locking device 26 with a corresponding annular collar 36, which should be considered to be a complementary-shaped locking device 36 of the plug-in unit 30. The mode of operation of the recesses 38 of the locking element 18, which define a detaching position, will be described further below with reference to FIG. 8 to FIG. 11.

As can also be seen in FIG. 1, a portion 40 is formed on the receiving unit 12, on which portion the receiving unit 12 can be connected to a fluid line (not shown). A further O-ring 42 is provided on the portion 40 in order to ensure that this connection is sealed with the fluid line (not shown).

The connection unit 10 also comprises a release element 44 and an indicator element 46. The release element 44 is arranged via a cylindrical portion 48 in a receptacle 50 provided for this purpose in the main body 14 in such a way that the release element 44 snaps into the receptacle 50 and, according to the design of the cylindrical portion 48 in the receptacle 50, is pivotably mounted about a central axis X of the cylindrical portion 48. The release element 44 also comprises a projection 52 which is dimensioned in such a way that it protrudes into the receiving space 28 of the receiving unit 12 (see FIG. 4).

The indicator element 46 comprises at its end shown on the left in FIG. 1 an engagement portion 54 which is designed to mate with a corresponding engagement portion 56 of the release element. At its opposite end, the indicator element 46 has a grip element 58, which is designed in this case as a ring. The indicator element 46 extends as an elongate rod between the engagement portion 54 and the grip element 58, with a receiving surface 60 being arranged at a predetermined point on the elongate rod, which receiving surface is designed in this case as a broadening of the elongate rod. A machine-readable code (not shown) can be applied to the receiving surface 60 of the indicator element 46, for example by printing, lasering or gluing. The machine-readable code can be captured by a scanner for EDP documentation of the connection of the connection unit 10.

In a holding state in which the release element 44 secures the indicator element 46 on the receiving unit 12 via the corresponding engagement portions 54 and 56, the release element 44 is protected from accidental displacement relative to the main body 14 via latching lugs 62 which engage in corresponding recesses 64 of the main body 14 of the receiving unit 12.

Figure 2:
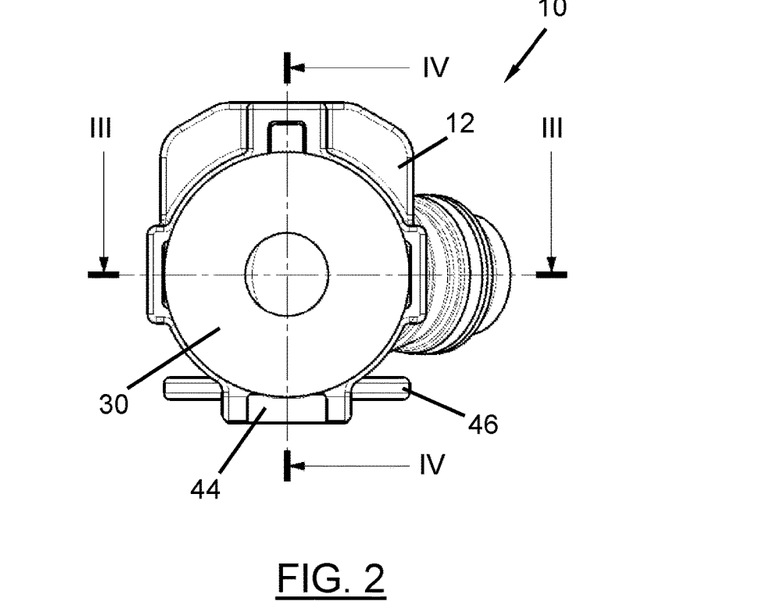
FIG. 2 is a side view of the connection unit according to the invention according to the arrow II from FIG. 1, but in an assembled state.

FIG. 2 shows the connection unit 10 according to the invention in a side view according to arrow II from FIG. 1, the components shown as an exploded view in FIG. 1 being assembled, and the plug-in unit 30 having already been partially inserted into the receiving space 28 of the receiving unit 12.

Figure 3:
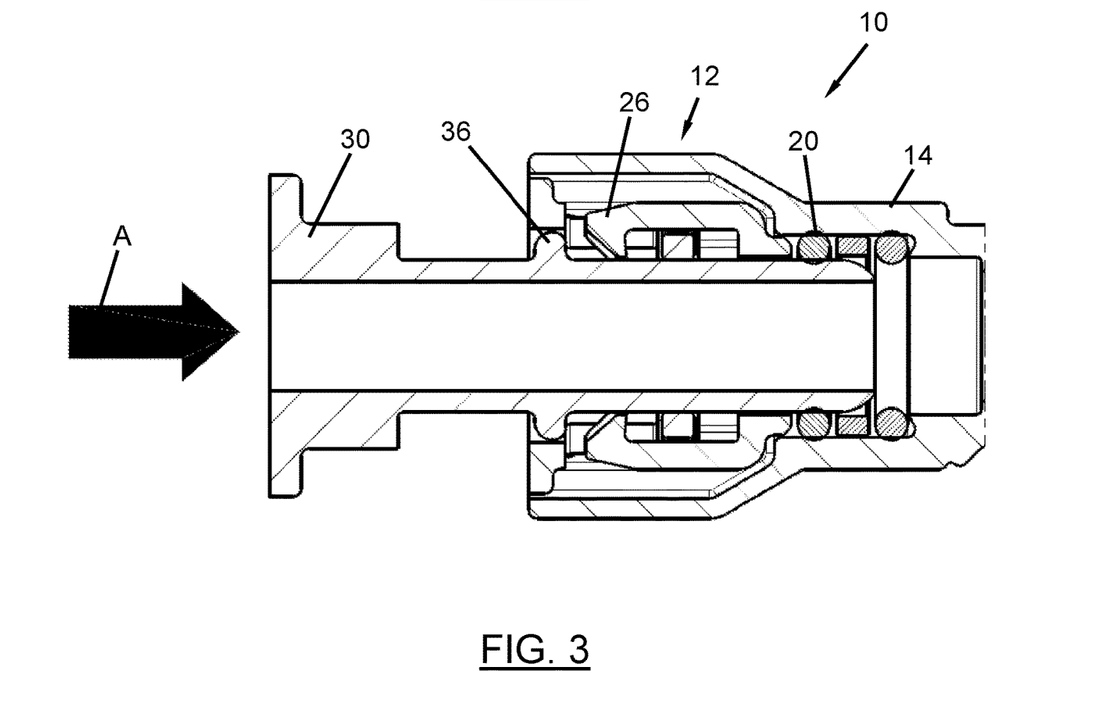
FIG. 3 is a side cross-sectional view of the connection unit from FIG. 2 taken along the section line III-II from FIG. 2.
Figure 4:
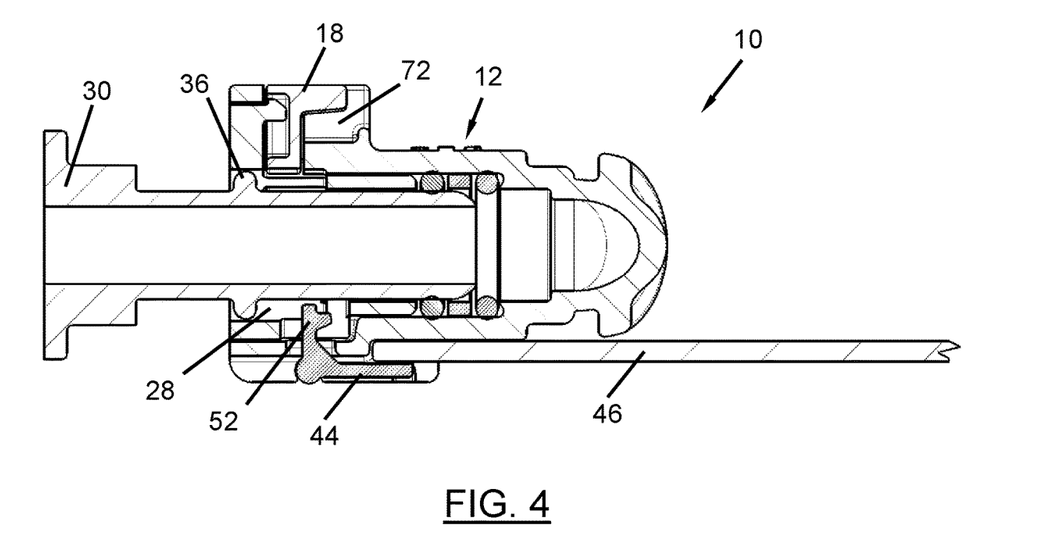
FIG. 4 is a further side cross-sectional view of the connection unit from FIG. 2, taken along the section line IV-IV from FIG. 2.

The side cross-sectional views of FIGS. 3 and 4 show how the plug-in unit 30 is inserted into the receiving unit 12 along the plug-in direction represented by the arrow A. It can be seen in this case that a front portion of the plug-in unit 30 (an end of the plug-in unit 30 on the right in FIGS. 3 and 4) has already come into contact with the sealing unit 20.

However, the locking device 36 of the plug-in unit 30 has not yet come into contact with the locking device 26 of the receiving unit 12, such that the correct connection between the receiving unit 12 and the plug-in unit 30 has not yet taken place.

In the side cross-sectional view of FIG. 4 (see the section lines from FIG. 2), rotated by 90°, it can be seen that the release element 44 is in its holding state and the indicator element 46 is thus attached to the receiving unit 12. The projection 52 of the release element 44, which protrudes into the receiving space 28 of the receiving unit 12, has not yet come into contact with the annular collar 36 of the plug-in unit 30. It can also be seen that the locking element 18 is in its lower position, i.e., the secured position.

Figure 5:
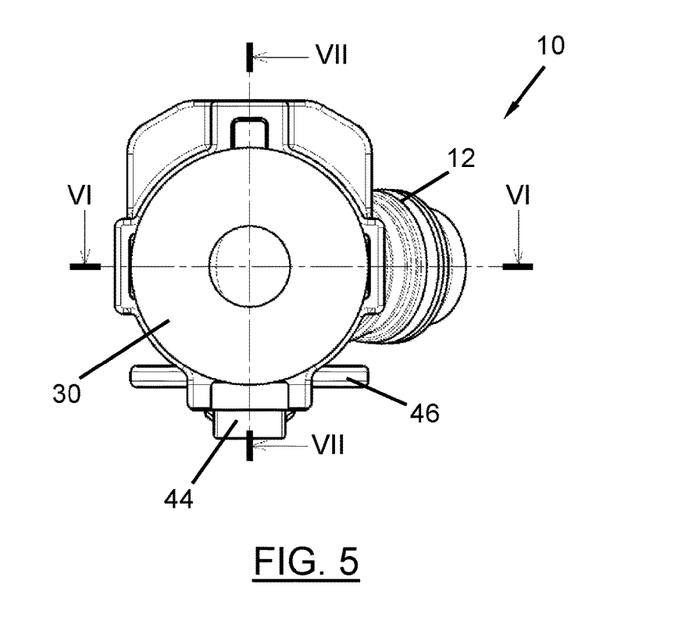
FIG. 5 is a further side view of the connection unit according to the invention according to the arrow V from FIG. 1, but in an assembled state.

FIG. 5 shows a view analogous to FIG. 2 (according to arrow V from FIG. 1), the release element 44 having been displaced into its release state.

Figure 6:
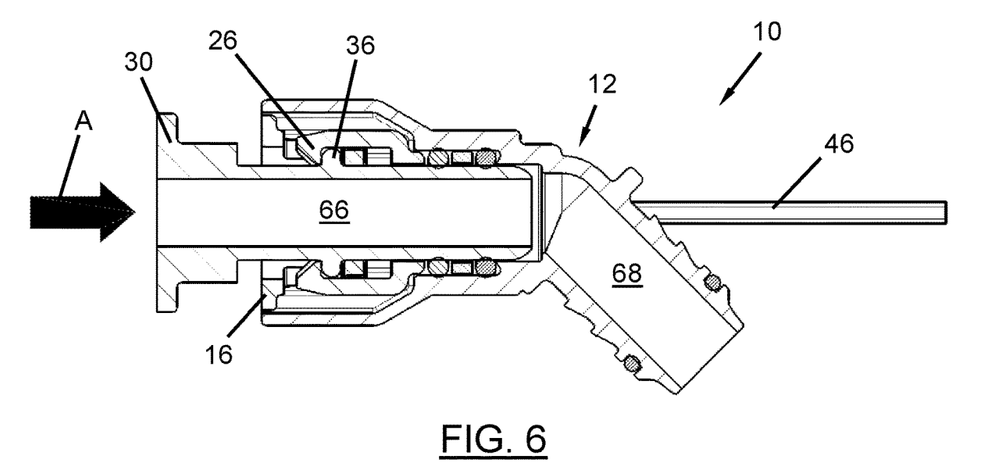
FIG. 6 is a side cross-sectional view of the connection unit from FIG. 5, taken along the section line VI-VI from FIG. 5.

As shown in FIG. 6, the plug-in unit 30 has been fully inserted into the receiving unit 12 along the plug-in direction A, such that the locking hooks 26 of the locking body 16 engage behind the annular collar 36 of the plug-in unit 30 to prevent the plug-in unit 30 from being pulled out counter to the plug-in direction A. Fluid flow channels 66 and 68 defined by the interior of the plug-in unit 30 and the receiving unit 12 are now connected to one another in a fluid-tight manner with respect to an outside of the connection unit 10.

Figure 7:
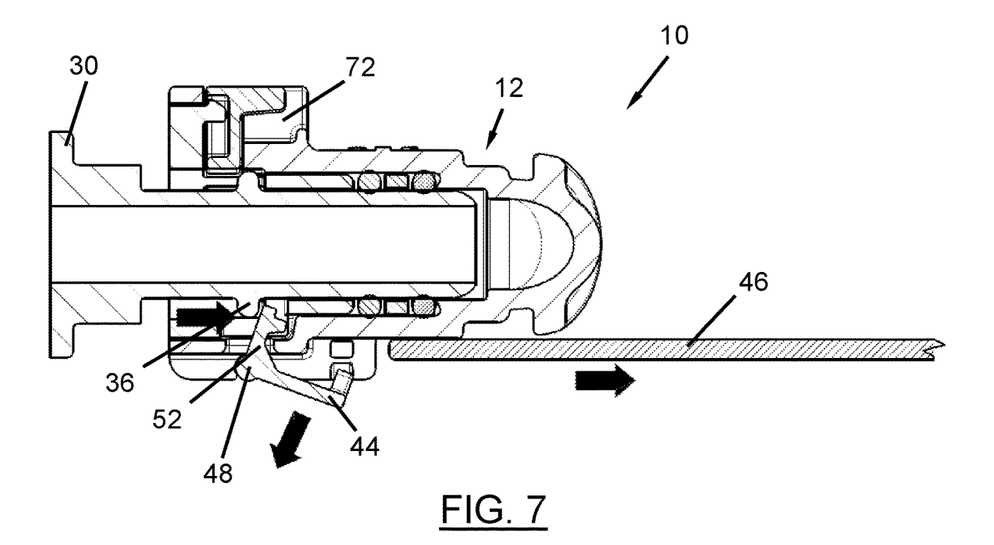
FIG. 7 is a further side cross-sectional view of the connection unit from FIG. 5, taken along the section line VII-VII from FIG. 5.

The annular collar 36 of the plug-in unit 30 has come into contact with the projection 52 of the release element 44 in the position of the plug-in unit 30 relative to the receiving unit 12, shown in FIG. 7, and has displaced the release element 44 about the central axis X of the cylindrical portion 48, out of the holding state and into the release state of the release element 44. In this release state of the release element 44, it is possible to detach the indicator element 46 from the release element 44 and from the rest of the connection unit 10, in particular the receiving unit 12 and the plug-in unit 30. The indicator element 46 can now be used to prove and/or document the correct connection of the receiving unit 12 and the plug-in unit 30 of the connection unit 10 according to the invention.

A lug is arranged on the projection 52 of the release element 44, which, when the release element 44 is in the release state, strikes a stop surface of the receiving unit 12, i.e. of the main body 14, in order to prevent a further displacement of the release element 44 via a relative position to the receiving unit 12, said position being assigned to the release state.

It can be seen from FIGS. 6 and 7 taken together that the indicator element 46 is only released, i.e. the plug-in unit 30 only displaces the release element 44 sufficiently to release the indicator element 46, if the plug-in unit 30 and the receiving unit 12 and/or their two locking devices 26 and 36 have been secured to one another (by locking in this embodiment).

Figure 8:
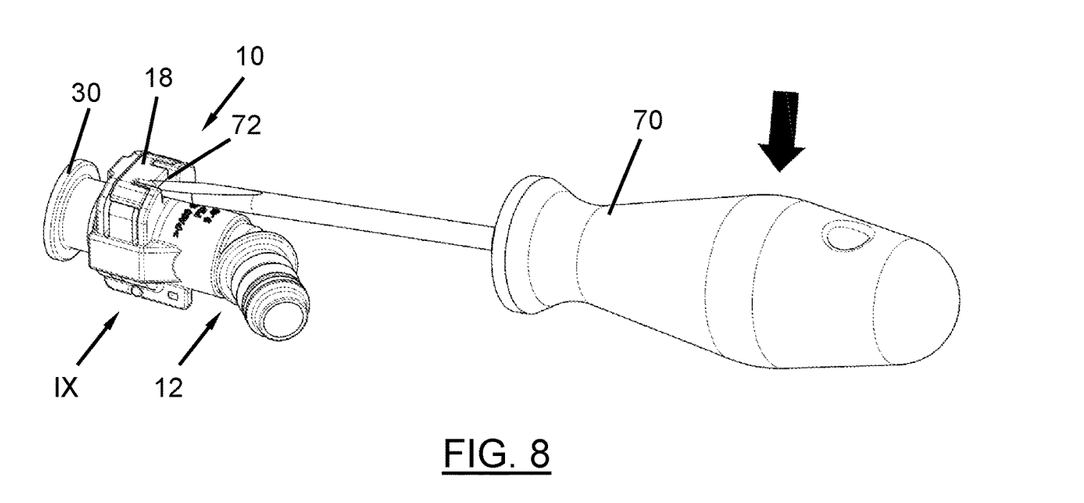
FIG. 8 is a perspective view of the connection unit according to the invention, and a tool.

FIG. 8 shows how a tool 70, in this case a slotted screwdriver, has been inserted into a receiving region 72 (see also FIGS. 4 and 7). By a lever-like movement of the tool 70 supported on a projection arranged in the receiving region, or by turning the tool 70, the locking element 18 can be displaced radially outwards from its securing position relative to the receiving unit 12.

Figure 9:
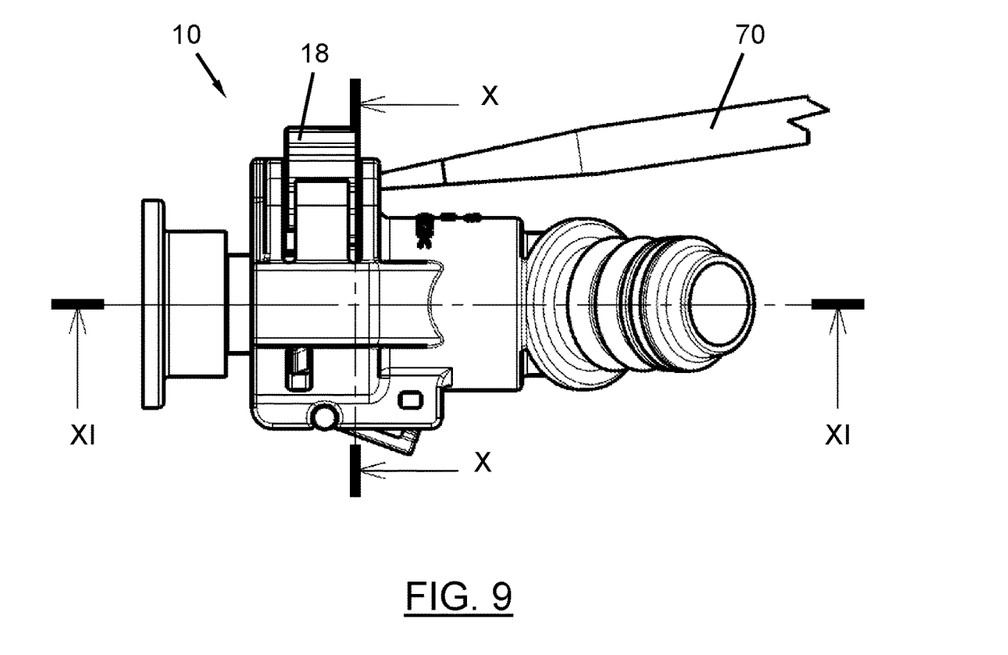
FIG. 9 is a side view according to the arrow IX from FIG. 8.
Figure 10:
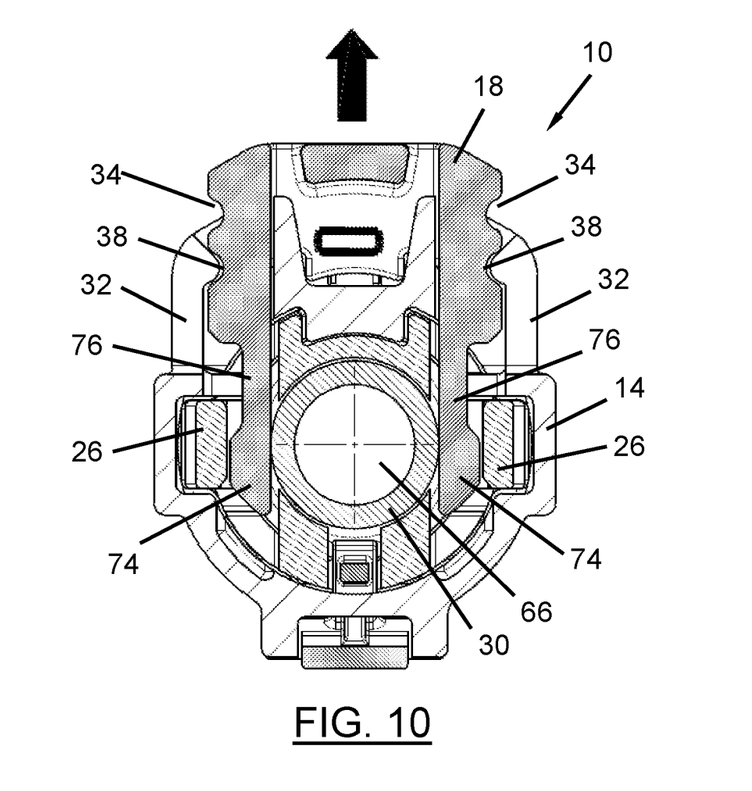
FIG. 10 is a side cross-sectional view of the connection unit according to the invention, taken along the line X-X from FIG. 9.

The side view according to FIG. 9, which is a view along the arrow IX from FIG. 8, shows how the locking element 18 has already been displaced into a detaching position by the tool 70. This can also be seen in the side cross-sectional view of FIG. 10 taken along the section line X-X from FIG. 9. It can be seen in this case how the locking element 18 is in a position in which the recesses 38 of the locking element 18 engage with the resilient hooks 32 of the main body 14. As a result of the displacement of the locking element 18 radially outwards relative to the fluid flow channel 66, enlargements 74 which are connected via arms 76 to an upper portion of the locking element 18 in FIG. 10 come into contact with the locking hooks 26 in such a way that the locking hooks 26 are displaced radially outwards relative to the fluid flow channel 66 and/or the plug-in unit 30. As can also be seen in FIG. 10, the arms 76 of the locking element 18 are dimensioned such that the locking hooks 26 are not displaced radially outwards by the locking element 18 in the securing position of the locking element 18 (which position is assigned to the recesses 34). The enlargements 74 in this case have outer, chamfer-like transitions to the arms 76 on their free ends to allow the locking hooks 26 to be displaced radially outwards, into and out of the securing position, when the locking element 18 is inserted and pulled out.

Figure 11:
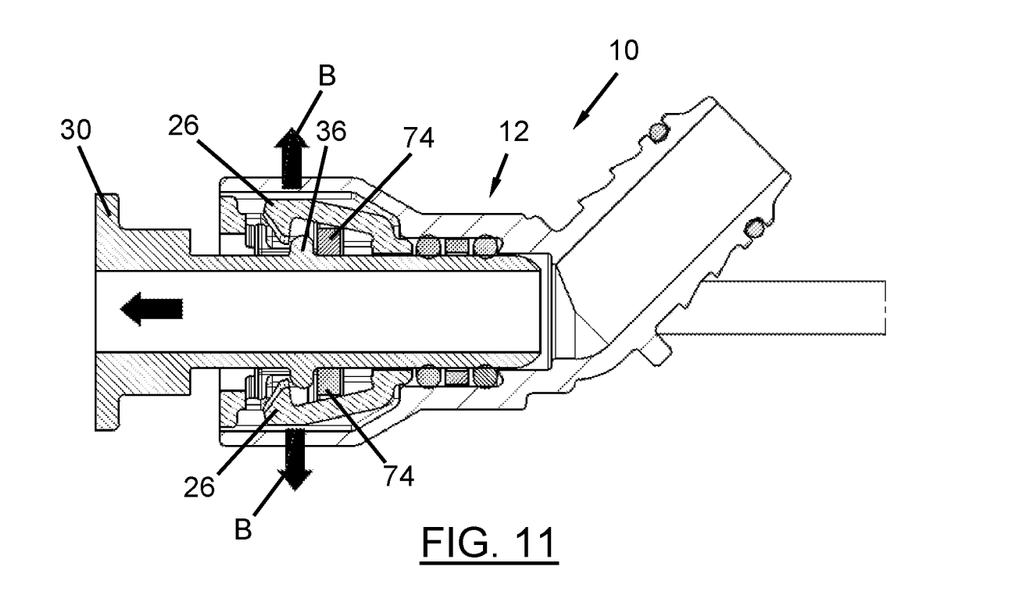
FIG. 11 is a side cross-sectional view of the connection unit according to the invention, taken along the line XI-XI from FIG. 9.

FIG. 11, which corresponds to the section line XI-XI from FIG. 9, shows that the locking hooks 26 have been displaced far enough radially outwards (see arrows B) by the enlargements 74 that the annular collar 36 of the plug-in unit 30 can be led past the locking hooks 26, and thus the plug-in unit 30 can be removed from the receiving unit 12.

In order to prevent the locking element 18 from being displaced radially outwards beyond the detaching position, which is assigned to the recesses 38, in the embodiment shown (see FIG. 1), a projection 78 of the locking body 16 engages in a corresponding recess 80 of the locking element 18.

A further embodiment of the connection unit according to the invention will be described in FIGS. 12 to 18, components which are similar to the connection unit 10 according to the invention which has been described above being denoted by the same reference numbers, but increased by the number 100. In general, it should be noted at this point that all features, functions and effects that have been described with reference to the connection unit 10 according to the invention can also be applied to the connection unit 110 according to the invention, and vice versa, such that only the differences between the connection units 10 and 110 are described below.

Figure 12:
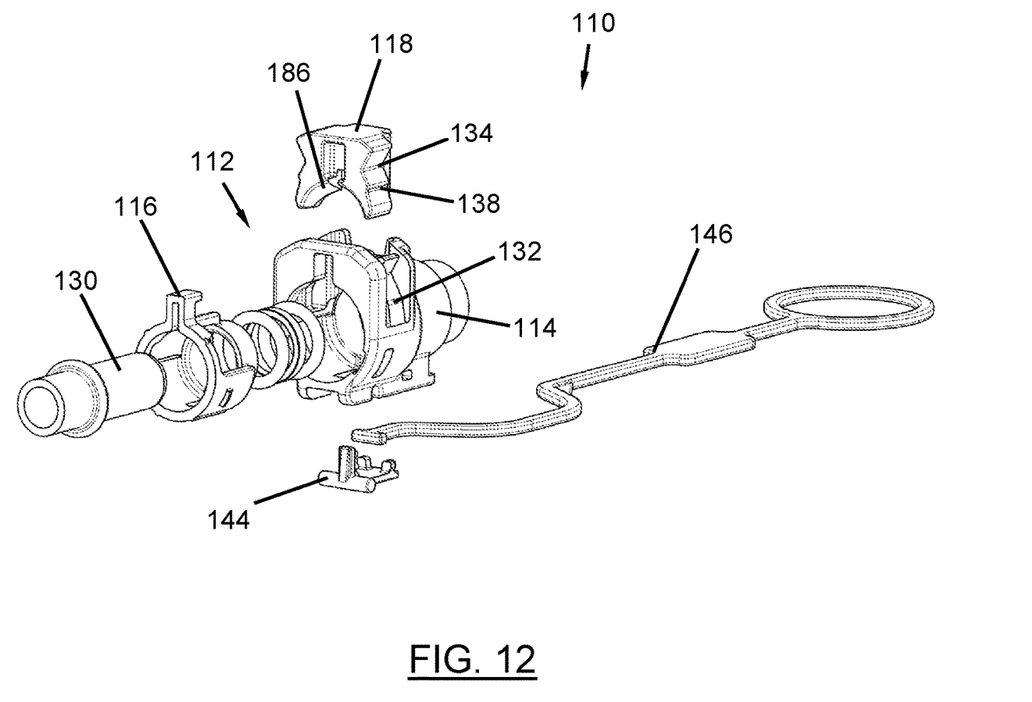
FIG. 12 is an exploded perspective view of a second embodiment of a connection unit according to the invention.

The connection unit 110 according to the invention, which is shown in an exploded view in FIG. 12, comprises a receiving unit 112 which in turn comprises a main body 114 with which a locking element 118, a release element 144, and a locking body 116 are connected. The locking element 118 is accommodated in a corresponding receptacle in the main body 114 and is held by resilient hooks 132 which engage, by projections 182 (see FIG. 16) formed thereon, in corresponding recesses 134 of the locking element 118. This interaction of the projections 182 and the recesses 134 defines a securing position of the locking element 118 relative to the main body 114. An indicator element 146 is also shown, which is held on the main body 114 by the release element 144. The indicator element 146 has a curved profile in this case, which is due, for example, to an installation situation of the connection unit 110 for a special application. A plug-in unit 130 which can be inserted into the receiving unit 112 is shown in FIG. 12 on the far left. In this case, the plug-in unit 130 can be designed identically to the plug-in unit 30.

In contrast to the embodiment 10 of a connection unit according to the invention, in the embodiment 110 of the connection unit according to the invention, the primary locking between the plug-in unit 130 (see FIG. 13) and the receiving unit 112 is achieved by the interaction of an annular collar 136 of the plug-in unit 130 with a corresponding locking projection 186 which is formed on the locking element 118.

The locking projection 186 is designed on the locking element 118 so as to be substantially arched around a central axis X (see FIG. 15) in the circumferential direction. A radially inward-pointing surface of the locking projection 186 extends so as to be inclined in relation to a plug-in direction (and/or to the central axis X) of the plug-in unit 130 into the receiving unit 112 in such a way that the extension of the locking projection 186 radially inwards increases as viewed in the plug-in direction of the plug-in unit 130 into the receiving unit 112.

Figure 13:
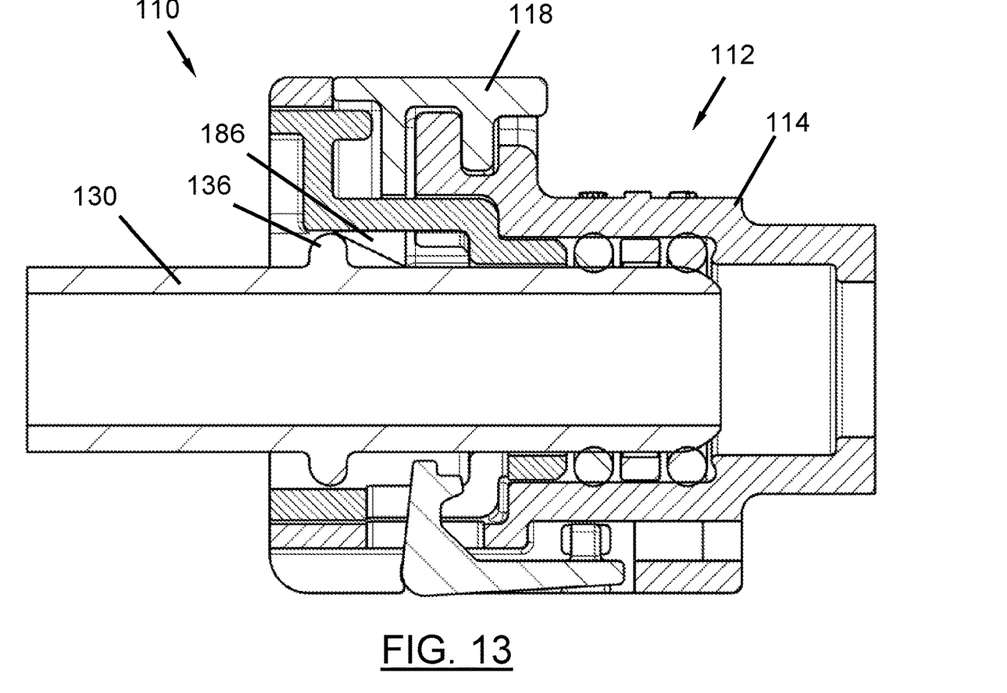
FIG. 13 is a side cross-sectional view of the connection unit from FIG. 13 in an initial connection state.

As can be seen in FIG. 13, the annular collar 136 of the plug-in unit 130 comes into contact with the locking projection 186 when it is inserted into the receiving unit 112, and forces the locking element 118 radially outwards when the plug-in unit 130 is pushed in further. Here, the resilient hooks 132 are pushed outwards against their elastic restoring force.

Figure 14:
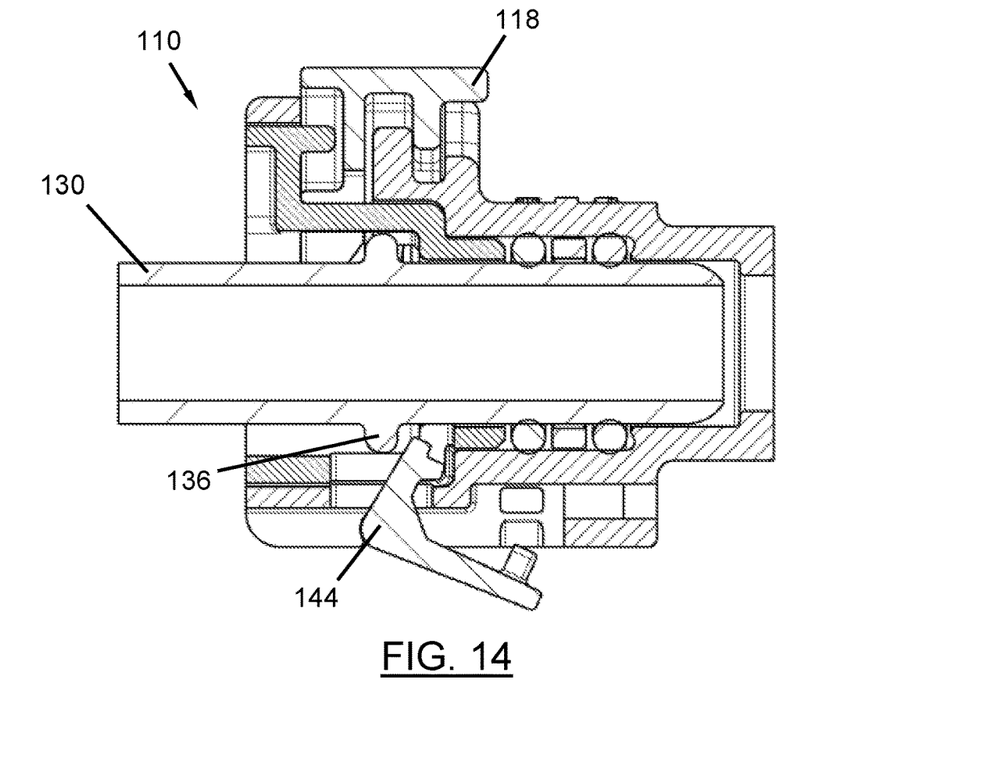
FIG. 14 is a further side cross-sectional view of the connection unit from FIG. 12 in an advanced connection state.

As can be seen in FIG. 14, in the embodiment 110 of the connection unit according to the invention, the release element 144 is also displaced by contact with the annular collar 136 of the plug-in unit 130 in such a way that the indicator element 146 (in the closed position according to FIG. 13 or the open position according to FIG. 14, each not shown) is released.

Figure 15:
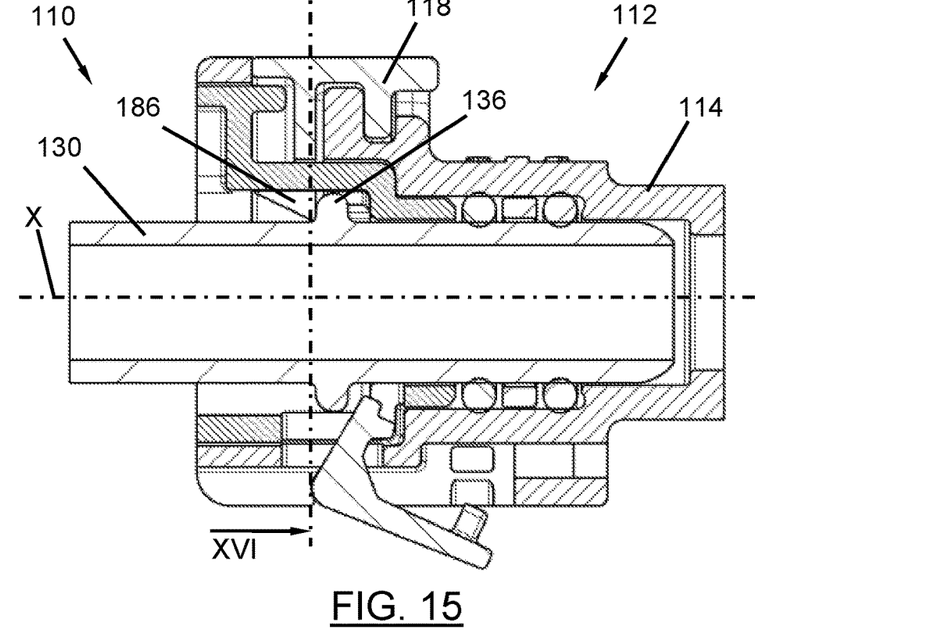
FIG. 15 is a further side cross-sectional view of the connection unit from FIG. 12 in a final connection state.
Figure 16:
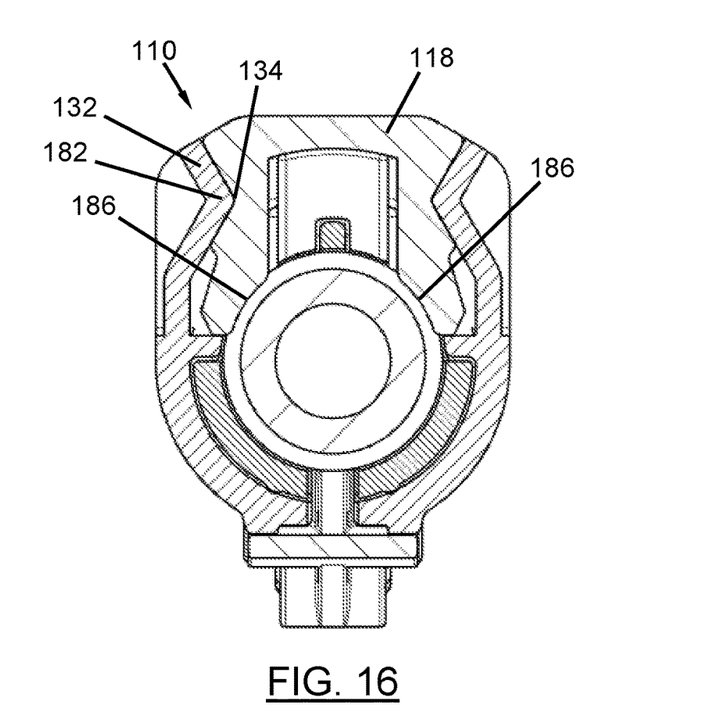
FIG. 16 is a further side cross-sectional view of the connection unit from FIG. 12 in the final connection state, taken along the section line XVI-XVI from FIG. 15.

In FIG. 15, the plug-in unit 130 has reached its final position relative to the receiving unit 112, for example relative to the main body 114 of the receiving unit 112, with the annular collar 136 of the plug-in unit 130, viewed in a radial direction, substantially no longer overlapping the locking projection 186 of the locking element 118. Due to the elastic restoring force of the resilient hooks 132 and the correspondingly formed contact surfaces of the locking element 118 (see also FIG. 16), the locking element 118 is pushed back into its securing position, in which a substantially radially extending surface or an undercut surface of the locking projection 186 engages behind the annular collar 136 of the plug-in unit 130. This can prevent the plug-in unit 130 from being unintentionally pulled out of the receiving unit 112, either completely or only partially, to such an extent that the sealing function between the plug-in unit 130 and the receiving unit 112 is no longer ensured. As has also been described for the connection unit 10 according to the invention with reference to FIGS. 8 to 11, the connection unit 110 according to the invention is also designed in such a manner that the plug-in unit 130 can be separated from the receiving unit 112 in a controlled manner.

Figure 17:
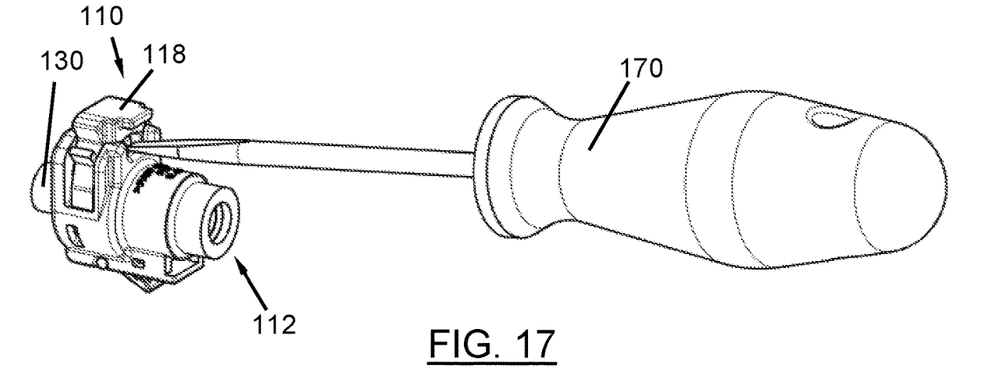
FIG. 17 is a perspective view of the connection unit according to the invention from FIG. 12, in an open connection state, and a tool.
Figure 18:
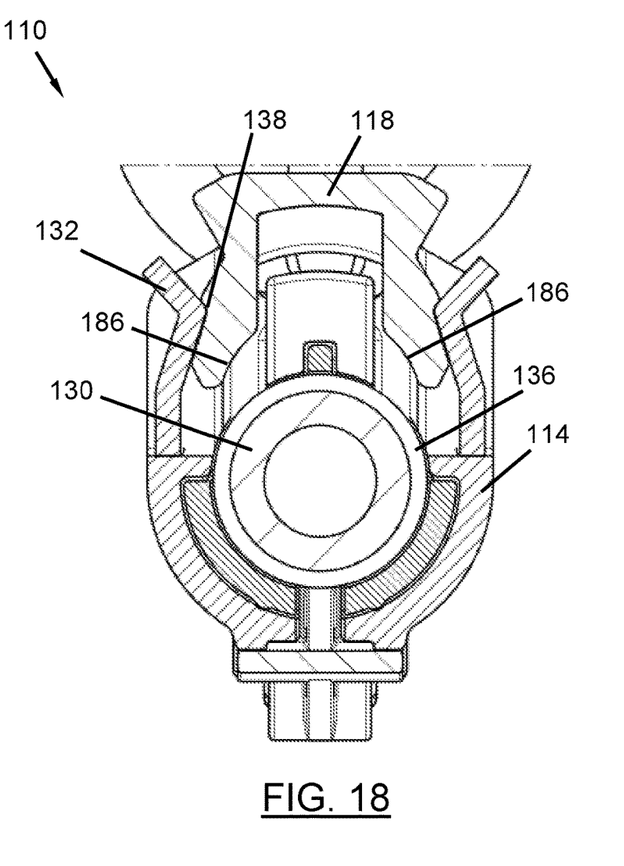
FIG. 18 is a side cross-sectional view of the connection unit from FIG. 17 in the open connection state.

As shown in FIG. 17, in the case of the connection unit 110, analogously to the connection unit 10, the locking unit 118 is displaced radially outwards from its securing position using a tool 170. In a detaching position, which is shown in FIG. 18, in which the locking element 118 is displaced further radially outwards than in the transitional position, which is shown in FIG. 14, the resilient hooks 132 of the main body 114 engage with recesses 138 of the locking unit 118 in order to hold the locking unit 118 in this detaching position. The locking projection 186, which is designed as a two-part arched surface in the cross-sectional view according to FIG. 18, is displaced far enough radially outwards in the detaching position of the locking element 118 that the plug-in unit 130, together with the collar 136 formed thereon, can be pulled out in the axial direction X from the receiving unit 112.

In order to bring the receiving unit 112 back into a state in which the receiving unit 112 performs an automatic locking with the plug-in unit 130, the locking element 118 of the connection unit 110 can be displaced back into the securing position, for example using a finger of a user.

The invention claimed is:

1. A connection unit for connecting fluid lines, comprising:
   a plug-in unit, wherein the plug-in unit is connectable to a first fluid line which does not belong to the connection unit, the plug-in unit defining a first fluid flow channel in an interior of the plug-in unit, and
   a receiving unit, wherein the receiving unit is connectable to a second fluid line which does not belong to the connection unit, the receiving unit defining a second fluid flow channel in an interior of the receiving unit,
   wherein the plug-in unit and the receiving unit are connectable to one another so that a fluid connection is established between the first fluid flow channel and the second fluid flow channel,
   wherein the connection unit further comprises a release element, wherein the release element is transferrable from a holding state to a release state upon insertion of the plug-in unit into the receiving unit up to a predetermined depth, and
   wherein the connection unit further comprises an indicator element formed separately from the release element, wherein the indicator element locked by the release element when the release element is in the holding state, and wherein the indicator element is detachable from the rest of the connection unit when the release element is in the release state.

2. The connection unit of claim 1, wherein the indicator element comprises an elongate rod element provided, on one end, with an engagement structure matching a counter-shaped engagement structure of the release element, and, on another end, with a grip element.

3. The connection unit of claim 2, wherein the grip element comprises a tab or a ring.

4. The connection unit of claim 1, wherein the indicator element has a length corresponding at least to a length of the fluid flow channel of the receiving unit.

5. The connection unit of claim 1, wherein the indicator element comprises a machine-readable marking.

6. The connection unit of claim 1, wherein the indicator element is removable from the connection unit along a direction substantially parallel to one or more of (A) a central axis of the first fluid flow channel or the second fluid flow channel (B) a plug-in direction of the plug-in unit into the receiving unit.

7. The connection unit of claim 1, wherein the release element is attached to the receiving unit and is pivotable relative to the receiving unit.

8. The connection unit of claim 1, wherein the release element comprises a projection, wherein the projection protrudes, when the release element is in the holding state, into a receiving space of the receiving unit configured to receive the plug-in unit so that when the plug-in unit is inserted into the receiving unit, a portion of the plug-in unit comes into contact with the projection of the release element, such that a further insertion of the plug-in unit into the receiving unit displaces the release element in the direction of the release state.

9. The connection unit of claim 1, wherein the release element is locked in its holding state with the receiving unit.

10. The connection unit of claim 1, wherein the release element comprises a cylindrical portion, wherein a center line of the cylindrical portion defines, when the release element is arranged on the receiving unit, a pivot axis of the release element relative to the receiving unit.

11. The connection unit of claim 10, wherein the cylindrical portion of the release element is connected to the receiving unit via a snap connection.

12. The connection unit of claim 1, wherein the receiving unit comprises a first locking device configured to interact with a corresponding second locking device of the plug-in unit so that the plug-in unit automatically locks to the receiving unit upon insertion of the plug-in unit into the receiving unit up to the predetermined depth.

13. The connection unit of claim 1, wherein the receiving unit comprises a main body and a locking body, the main body comprising a first portion for connection to the second fluid line, and the locking body comprising a second portion for connection to the plug-in unit.

14. The connection unit of claim 13, wherein the locking body is insertable, at least partially, into the main body and, in inserted state, is secured against rotation on the main body.

15. The connection unit of claim 1, wherein the connection unit is configured so that the indicator element is released by the release element after or at a same time as a predetermined connection state of the plug-in unit with the receiving unit has been reached.

16. The connection unit of claim 1, wherein the indicator element is detachable non-destructively.

17. The connection unit of claim 3, wherein the grip element comprises a single piece together with the elongate rod element.

18. The connection unit of claim 4, wherein the length of the indicator element is at least three times the length of the fluid flow channel of the receiving unit.

19. The connection unit of claim 5, wherein the machine-readable marking comprises a data matrix code ("DMC code").

20. The connection unit of claim 8, wherein the portion of the plug-in unit comprises an annular collar.

21. The connection unit of claim 12, wherein the second locking device comprises one or more of a projection or a recess of the plug-in unit.

\* \* \* \* \*